H. E. NEWTON.
Broom.
No. 61,446.    Patented Jan. 22, 1867.
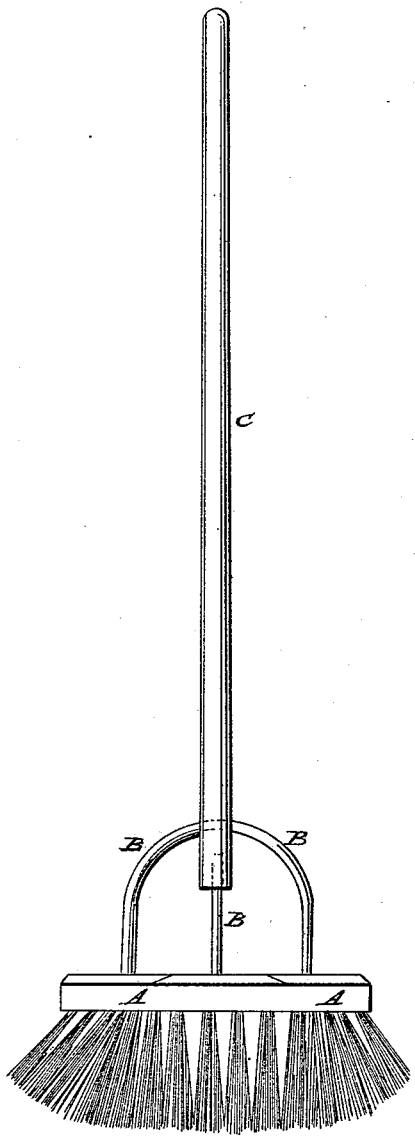

United States Patent Office.

HENRY E. NEWTON, OF MANCHESTER, NEW HAMPSHIRE, ASSIGNOR TO HIMSELF AND WILLIAM A. NEWTON, OF SAME PLACE.

Letters Patent No. 61,446, dated January 22, 1867.

IMPROVED BROOM.

The Schedule referred to in these Letters Patent and making part of the same.

TO ALL WHOM IT MAY CONCERN:

Be it known that I, HENRY E. NEWTON, of Manchester, in the county of Hillsborough, and State of New Hampshire, have invented a new and useful improvement in Brooms; and I do hereby declare that the following is a full, clear, and exact description thereof, which will enable others skilled in the art to make and use the same, reference being had to the accompanying drawings, forming part of this specification.

This invention relates to a new manner of securing the handle to the broom head. The invention consists in attaching one or more springs to the broom head, and securing their upper ends to the handle in such a manner that they form the connection between the handle and the broom head. A bristle broom which is thus arranged will have as much spring and elasticity as any broom made of broom-corn; and also, the latter kind will, especially after having been used for some time, be much more elastic and handy than those generally used. The same principle can be applied to all kinds of brooms, dusters, and similar articles. In the annexed drawing, which represents a side elevation of my improved broom, my invention is illustrated.

A represents the broom head, which may be of any suitable material or construction. To the head are secured in any convenient manner one or more springs, B B, their upper ends being attached to the handle C of the broom, as shown. The springs may be made of various designs, and I do not wish to confine myself to any number of such springs to each broom.

I claim as new, and desire to secure by Letters Patent—

One or more springs, B, which connect the handle C with the broom head A, substantially in the manner and for the purpose herein shown and described.

The above specification of my invention signed by me this 9th day of November, 1866.

HENRY E. NEWTON.

Witnesses:
    WM. F. MCNAMARA,
    ALEX. F. ROBERTS.